US012555342B2

(12) United States Patent
Woo et al.

(10) Patent No.: US 12,555,342 B2
(45) Date of Patent: Feb. 17, 2026

(54) EDGE-CENTRIC SPACE RESCALING METHOD FOR DISSIMILAR SPACE REGISTRATION AND SYSTEM THEREFOR

(71) Applicant: KOREA ADVANCED INSTITUTE OF SCIENCE AND TECHNOLOGY, Daejeon (KR)

(72) Inventors: Woontack Woo, Daejeon (KR); Dooyoung Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 173 days.

(21) Appl. No.: 18/611,759

(22) Filed: Mar. 21, 2024

(65) Prior Publication Data

US 2025/0046040 A1    Feb. 6, 2025

(30) Foreign Application Priority Data

Aug. 1, 2023 (KR) .......... 10-2023-0100226

(51) Int. Cl.
 *G06T 19/20* (2011.01)
(52) U.S. Cl.
 CPC ...... *G06T 19/20* (2013.01); *G06T 2219/2016* (2013.01)
(58) Field of Classification Search
 None
 See application file for complete search history.

(56) References Cited

U.S. PATENT DOCUMENTS 10,977,827 B2 *  4/2021  Mauchly .......... G06N 3/09
11,200,754 B1 * 12/2021  Macagnano ...... G06T 17/00

OTHER PUBLICATIONS

Tomar, Yash, et al. "Conformal redirected walking for shared indoor spaces." Proceedings of the 17th ACM SIGGRAPH International Conference on Virtual-Reality Continuum and its Applications in Industry. 2019. (Year: 2019).*
Kim, Dooyoung, and Woontack Woo. "Edge-centric space rescaling with redirected walking for dissimilar physical-virtual space registration." 2023 IEEE International Symposium on Mixed and Augmented Reality (ISMAR). IEEE, 2023. (Year: 2023).*
Kim, Dooyoung, et al. "The effects of spatial configuration on relative translation gain thresholds in redirected walking." Virtual Reality 27.2 (2023): 1233-1250. (Year: 2023).*

(Continued)

*Primary Examiner* — Zhengxi Liu
(74) *Attorney, Agent, or Firm* — S.J. INTELLECTUAL PROPERTY LTD.

(57) ABSTRACT

An edge-centric space rescaling method which is a new space rescaling technique for registering dissimilar physical-virtual spaces by utilizing the effects of adjusting physical space with redirected walking (RDW) and a system therefor are provided. The edge-centric space rescaling method includes dividing physical space into grid units based on basic geometric information of an object, applying relative translation gains (RTGs) to physical space grids divided in redirected walking (RDW), and registering objects of interest in virtual space to a corresponding target in physical space to rescale the virtual space to the physical space, while maintaining a coordinate system between the virtual space and the physical space.

19 Claims, 7 Drawing Sheets

(56) References Cited

OTHER PUBLICATIONS

Kim, Dooyoung, et al. "Adjusting relative translation gains according to space size in redirected walking for mixed reality mutual space generation." 2021 IEEE Virtual Reality and 3D User Interfaces (VR). IEEE, 2021. (Year: 2021).*
Pabst, Michael, et al. "MRUnion: Asymmetric Task-Aware 3D Mutual Scene Generation of Dissimilar Spaces for Mixed Reality Telepresence." IEEE Transactions on Visualization and Computer Graphics (2025). (Year: 2025).*
G. T. Anderson and G. Yang, "A proposed measure of environmental complexity for robotic applications," 2007 IEEE International Conference on Systems, Man and Cybernetics, Montreal, QC, Canada, 2007, pp. 2461-2466, doi: 10.1109/ICSMC.2007.4414027.

* cited by examiner

| Space | Size (m) | Table Size (m) | C(E) | OS(E) | SC(E) |
|---|---|---|---|---|---|
| XR Studio | 8.4 x 6.0 | 4.10 x 0.80 | 6.50 | 69.18 | 115.30 |
| XR Lab | 6.8 x 3.6 | 3.95 x 0.75 | 7.36 | 6.68 | 43.04 |
| Meeting Room | 7.6 x 3.5 | 3.00 x 1.20 | 6.64 | 14.56 | 48.80 |
| Home | 6.8 x 6.0 | 1.70 x 0.85 | 8.55 | 7.27 | 57.92 |
| Office | 3.5 x 2.7 | 2.00 x 0.90 | 3.30 | 9.27 | 17.42 |

Five input spaces'size, table (main object) surface size, the complexity of environment C(E), object scatteredness OS(E), and spatial complexity S(E).

FIG. 5B

| Space Pairs | $SD(E_{virt}, E_{phys})$ | $SD(E_{virt}, E_{phys})$ |
|---|---|---|
| XR Studio & XR Lab | 0.9841 | 0.0985 |
| XR Studio & Meeting Room | 0.8598 | 0.2442 |
| XR Studio & Home | 0.6884 | 0.4464 |
| XR Studio & Office | 1.8900 | 1.2367 |

Space pairs' $SD(E_{virt}, E_{phys})$ and $SMD(E_{virt}, E_{phys})$.

FIG. 6

EDGE-CENTRIC SPACE RESCALING METHOD FOR DISSIMILAR SPACE REGISTRATION AND SYSTEM THEREFOR

CROSS-REFERENCE TO RELATED APPLICATIONS

A claim for priority under 35 U.S.C. § 119 is made to Korean Patent Application No. 10-2023-0100226 filed on Aug. 1, 2023, in the Korean Intellectual Property Office, the entire contents of which are hereby incorporated by reference.

BACKGROUND

Embodiments of the present disclosure described herein relate to an edge-centric space rescaling method for dissimilar space registration and a system therefor, and more particularly, relate to a novel space rescaling technique for registering dissimilar physical-virtual spaces by utilizing the effects of adjusting physical space with redirected walking (RDW).

The emergence of augmented reality (AR), virtual reality (VR), and mixed reality (MR) head mounted displays (HMDs) has enabled users to experience virtual or remote spaces as if they were present there. These spatial computing devices provide a higher sense of realism and immersion than traditional 2D displays. Furthermore, remote users are able to feel a sense of coexistence in a mutual space, unlike video chat. To experience virtual space with such a high level of immersion, it is necessary to register the target virtual space to the user's tracked physical space by overcoming the differences in spatial configuration. However, current VR HMDs rely on the user to define an empty subspace, which restricts the user's movement and limits the utilization of spatial information such as objects and walls in the real space. Additionally, these user-defined space registration systems only support a single state of the user, assuming the user is standing or sitting, which limits the development of narrative VR experience with user's state changes. In order to solve these limitations, the space registration system should allow the utilization of basic geometric information from the physical space in the virtual environment and support user's state changes where they are able to walk around, sit on a chair, or interact with planar surface according to the context of VR content.

One of the major challenges when registering the virtual environment to the physical environment is to overcome the spatial dissimilarity between spaces and secure sufficient areas where the user is able to freely move around and interact with virtual content. Previous forced-mapping methods may connect users' every position in their tracked physical space to the target virtual space, but communication errors may occur due to the misalignment of avatars. Similarly, redirected walking controllers are able to enable users to explore a wider virtual environment from their limited physical space, but the usage of rotation gains induced the coordinate distortion between physical space and virtual space. On the other hand, the alignment-based space registration methods are able to unify a coordinate system between virtual physical space so the users are able to utilize planar and edge information of physical space in virtual space. However, since they may not make an effect of modifying the space, one-to-one scale spatial matching methods may struggle to secure sufficient mutual area when dissimilarity between spaces is high. The space registration method should enable the effects of adjusting space while maintaining the unified coordinate system between virtual space and physical space.

In other words, for an immersive VR experience, it is necessary to overcome spatial dissimilarity between physical space and virtual space and register the target VR environment to the user's tracked physical space. However, existing one-to-one scale space-matching algorithms are unable to secure sufficient interactable areas when the physical space and the virtual space are highly dissimilar. On the other hand, redirected walking controllers are able to expand explorable virtual space from the limited physical space but are unable to utilize basic geometric information from the physical space in the virtual space due to the coordinate distortion.

To address such problems, an embodiment of the present disclosure proposes a novel space-rescaling technique for registering dissimilar physical-virtual spaces by utilizing the effects of adjusting physical space with redirected walking (RDW).

PRIOR ART DOCUMENTS

Non-Patent Documents

G. T. Anderson and G. Yang. A proposed measure of environmental complexity for robotic applications. In 2007 IEEE International Conference on Systems, Man and Cybernetics, pp. 2461-2466. IEEE, 2007. 3

SUMMARY

Embodiments of the present disclosure provide an edge-centric space rescaling method for dissimilar space registration to apply relative translation gains (RTGs) to each of space grids divided based on the main interactable object's edge, which enables space modification effects to register vast interactable space while maintaining the coordinate system between physical space and virtual space, and a system therefor.

Embodiments of the present disclosure provide an edge-centric space rescaling method for dissimilar space registration to register virtual space to physical space by utilizing basic geometric information, such as edges, floors, walls, horizontal surfaces, and vertical surfaces, and a system therefor.

Embodiments of the present disclosure provide an edge-centric space rescaling method for dissimilar space registration to register virtual space to dissimilar physical space through a space rescaling technique using translation-gain based redirected walking (RDW) and relative translation gains (RTGs) and a system therefor.

However, technical problems to be addressed by the present disclosure is not limited to the problem, and may be expanded in various manners from a range which does not deviate from the technical spirit and scope of the present disclosure.

According to an embodiment, an edge-centric space rescaling method by an edge-centric space rescaling system for dissimilar physical-virtual space registration may include dividing physical space into grid units based on basic geometric information of an object, applying relative translation gains (RTGs) to physical space grids divided in redirected walking (RDW), and registering objects of interest in virtual space to a corresponding target in physical space to rescale the virtual space to the physical space, while maintaining a coordinate system between the virtual space and the physical space.

According to an embodiment, the edge-centric space rescaling method by the edge-centric space rescaling system for the dissimilar physical-virtual space registration may further include quantitatively measuring spatial complexity, spatial dissimilarity, and spatial matching difficulty to assess the level of registering dissimilar physical-virtual spaces, after rescaling the virtual space to the physical space.

According to an embodiment, an edge-centric space rescaling method by an edge-centric space rescaling system for dissimilar physical-virtual space registration may include dividing physical space into grid units based on basic geometric information of an object, applying relative translation gains (RTGs) to physical space grids divided in redirected walking (RDW), registering objects of interest in virtual space to a corresponding target in physical space to rescale the virtual space to the physical space, while maintaining a coordinate system between the virtual space and the physical space, and quantitatively measuring spatial complexity, spatial dissimilarity, and spatial matching difficulty to assess the level of registering dissimilar physical-virtual spaces, after rescaling the virtual space to the physical space. The applying may include using a spatial registration optimization algorithm for space registration, for an edge sync ratio between the virtual space and the physical space.

According to an embodiment, an edge-centric space rescaling system for dissimilar physical-virtual space registration may include a grid division unit that divides physical space into grid units based on basic geometric information of an object, an application unit that applies relative translation gains (RTGs) to physical space grids divided in redirected walking (RDW), and a rescaling unit that registers objects of interest in virtual space to a corresponding target in physical space to rescale the virtual space to the physical space, while maintaining a coordinate system between the virtual space and the physical space.

According to an embodiment, the edge-centric space rescaling system for the dissimilar physical-virtual space registration may further include an assessment unit that quantitatively measures spatial complexity, spatial dissimilarity, and spatial matching difficulty to assess the level of registering dissimilar physical-virtual spaces, after rescaling the virtual space to the physical space.

According to an embodiment, an edge-centric space rescaling system for dissimilar physical-virtual space registration may include a grid division unit that divides physical space into grid units based on basic geometric information of an object, an application unit that applies relative translation gains (RTGs) to physical space grids divided in redirected walking (RDW), a rescaling unit that registers objects of interest in virtual space to a corresponding target in physical space to rescale the virtual space to the physical space, while maintaining a coordinate system between the virtual space and the physical space, and an assessment unit that quantitatively measures spatial complexity, spatial dissimilarity, and spatial matching difficulty to assess the level of registering dissimilar physical-virtual spaces, after rescaling the virtual space to the physical space. The rescaling unit may use a spatial registration optimization algorithm for space registration, for an edge sync ratio between the virtual space and the physical space.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Advantages, features, and methods of accomplishing the same in the present disclosure will become apparent with reference to embodiments described in detail below together with the accompanying drawings. However, the inventive concept is not limited by embodiments disclosed hereinafter, and may be implemented in various forms. Rather, these embodiments are provided so that this disclosure will be through and complete and will fully convey the concept of the invention to those skilled in the art, and the inventive concept will only be defined by the scope of the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of stated components, steps, operations, and/or elements, but do not exclude presence or addition of one or more other components, steps, operations, and/or elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, exemplary embodiments of the inventive concept will be described in detail with reference to the accompanying drawings. The same reference denotations are used for the same components on the drawings, and a duplicated description of the same components will be omitted.

Figure 1:
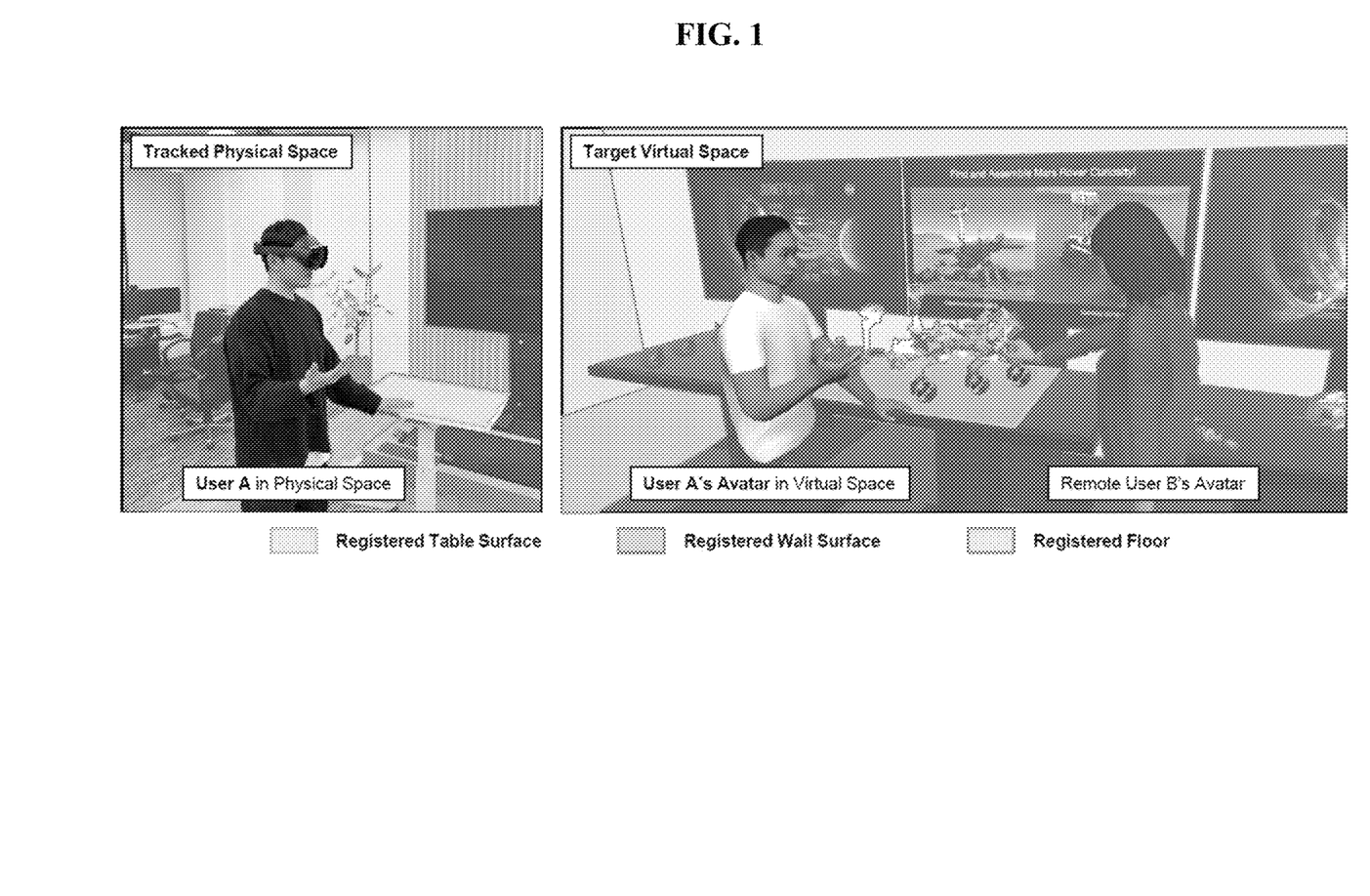
FIG. 1 illustrates a drawing for describing an edge-centric space rescaling method according to an embodiment of the present disclosure.

FIG. 1 illustrates a drawing for describing an edge-centric space rescaling method according to an embodiment of the present disclosure.

The edge-centric space rescaling method according to an embodiment of the present disclosure may focus on registering a certain subspace decided from the main interaction object with space-rescaling effects from translation-gain based redirected walking (RDW) to generate a unified coordinate system between virtual space and physical space.

An embodiment of the present disclosure may propose a method of registering virtual space to dissimilar physical space through a space rescaling technique using translation-gain based RDW and relative translation gains (RTGs).

In detail, an embodiment of the present disclosure may divide the physical space, which is the target of rescaling, into nine grids centered on the main object and may apply RTGs to each grid, making the space adjustment more adaptive. Furthermore, to ensure an immersive VR experience and prevent motion sickness, an embodiment of the present disclosure may linearly change gains between each grid so that the VR user's speed may change smoothly within the threshold range. With this rescaled physical space, an embodiment of the present disclosure may implement a spatial registration optimization algorithm to find optimal values for registering the virtual space to the physical space. Unlike the conventional approach of maximizing the semantic match ratio between the spaces, an embodiment of the present disclosure may employ evaluation metrics for space registration focused on aligning the main interaction object of the virtual environment to the proper physical space's object to enable physical touching in VR for a more immersive experience.

The user A in his tracked physical space (left) in FIG. 1 may be connected to the dissimilar target virtual space (right) through his avatar and may physically interact with the registered floor, table, and wall. At this time, each colored area refers to the registered area. Orange refers to the table surface, green refers to the wall surface, and blue refers to the movable floor.

As depicted in FIG. 1, the approach according to an embodiment of the present disclosure may increase the main object's registered edge and planar information and may secure a larger movable area from the limited physical environment with the edge-centric space rescaling technique. Furthermore, an embodiment of the present disclosure may formulate equations for computing spatial complexity (SC(E)) that may reflect not only object density but also space size and object distribution. Additionally, an embodiment of the present disclosure may define spatial dissimilarity ($SD(E_{virt}, E_{phys})$) and spatial matching difficulty ($SMD(E_{virt}, E_{phys})$) between virtual space and real space to help to design structured experiment by leverage the difficulty level of registering the target virtual space to the tracked physical space.

In addition, an embodiment of the present disclosure may conduct an evaluation using four space pairs for XR remote collaboration scenarios and may validate a proposed method (RTGGrid) against two other spatial registration methods (RTG-Single, 1:1 Scale). RTG-Single refers to applying a single RTG to the entire space, and 1:1 Scale refers to spatial matching with the original space scale. Results demonstrate that RTG-Grid is the most effective method in matching the main object's edge and planar information and securing the most expansive registered space area compared to other methods in every condition. Furthermore, an embodiment of the present disclosure may validate that SC(E) and SMD ($E_{virt}, E_{phys}$) are suitable for measuring spatial information and computing the spatial-matching difficulty between physical space and virtual space. Based on the analysis of the results, an embodiment of the present disclosure may derive three implications for developers to consider when developing a spatial registration optimization algorithm for registering dissimilar physical-virtual spaces. First, they should use RDW as a space-rescaling element to accurately match the edge and plane between physical space and virtual space rather than using it as a component to maximize movable space. Second, the objective function's primary factor should be set according to the main interaction object rather than maximizing the semantic match ratio. Lastly, an embodiment of the present disclosure may emphasize the importance of registering the subspace where users will interact most rather than aiming to map the entire space.

The contribution according to an embodiment of the present disclosure may be categorized into three main areas.

Firstly, an embodiment of the present disclosure may introduce a novel edge-centric space-rescaling technique with length-based RDW for registering virtual space to the user's tracked physical space. Unlike previous methods, the approach according to an embodiment of the present disclosure may focus on registering a main interaction object and its corresponding subspace rather than maximizing the movable space. Secondly, an embodiment of the present disclosure may develop equations to quantitatively measure the spatial complexity, spatial dissimilarity, and spatial matching difficulty to assess the level of registering dissimilar physical-virtual spaces. Lastly, an embodiment of the present disclosure may evaluate an algorithm with other space registration methods using inputs generated from real environments under the assumption of XR remote collaboration scenarios. Optimization results from evaluation may confirm an edge-centric space rescaling method according to an embodiment of the present disclosure, which is outperformed in synchronizing the edge and plane of main objects and walls and may secure the largest registered area compared to other methods. By leveraging the spatial registration optimization algorithm and evaluation metrics proposed in an embodiment of the present disclosure, developers may achieve optimal spatial registration results by adjusting the weights of optimization terms based on their VR content goals using objective function and implications.

The redirected walking (RDW) in an embodiment of the present disclosure is a VR locomotion technique used to increase the user's movable space by adjusting their visually perceived locomotion in VR within certain visual cognitive thresholds. Several RDW controllers have been developed to redirect user movement using various algorithms to maximize the navigable area while minimizing the collision and resets. However, these controllers include basic methods such as steer-to-center, steer-to-orbit, and steer-to-multi-targets, which redirect the user toward specific targets or paths. In addition, alignment-based RDW controllers, which consider the environmental compatibility of both physical space and virtual space, may redirect users more space-adaptively. However, the focus of RDW controllers is primarily on reducing the number of collisions and resets, resulting in a bias toward the boundary values of the threshold range. This bias may cause motion sickness when the gain changes abruptly from the lowest to the highest threshold value. To mitigate this effect, an embodiment of the present disclosure needs to create a redirection map that ensures gains to change smoothly as the user walks around while using the rescaling effects of RDW.

RDW controllers commonly use rotation, translation, and curvature gains, but rotation and curvature gains are used most frequently due to their more significant impact on spatial transformation. However, these gains make it challenging to incorporate edge and plane information of real-world objects or walls into virtual space since they distort the coordinate system of physical space and virtual space. An embodiment of the present disclosure may achieve an immersive VR experience when the edge and planar information between physical space and virtual space is aligned and the user may physically touch the objects. An embodiment of the present disclosure may propose utilizing the space-rescaling effects from RDW while maintaining the coordinate system to achieve this alignment. To do so, an embodiment of the present disclosure may use relative translation gains (RTGs), which enable space-adaptive scale adjusting by applying different translation gains to the width and depth in space. Although the concept of matching heterogeneous spaces with RTG was presented before, further research is needed to investigate more space-adaptive rescaling methods considering the complexity and composition of spaces and how to apply this space-rescaling technique to registering dissimilar space. To this end, an embodiment of the present disclosure will introduce an edge centric space-rescaling process with RTGs for registering dissimilar physical and virtual spaces.

The registration of virtual spaces to physical spaces in an embodiment of the present disclosure is a significant challenge in VR experiences, especially when the virtual space is larger than the physical space and has a different configuration. To address this challenge, previous studies have attempted to connect every position from the virtual space to the tracked physical space. However, this approach may not be feasible when the spatial configurations are highly dissimilar. To overcome this limitation, an avatar-reposition algorithm has been proposed to map the user's six degrees of freedom (DoFs) in the tracked space to the target space by learning the user's responses regarding user's decision about the proper remapped position in the target space. However, the retargeted six DoFs are not continuously related, so unexpected position shifts occur when the user moves around, which led to motion sickness and a break of immersion. On the other hand, other existing studies have attempted to match user movement smoothly between the tracked space and the target space by correlating objects of interest that the user wishes to move, but these methods may not generate a unified coordinate system, resulting in inaccurate user pointing and gazing direction. Thus, the primary objective of registering virtual space to physical space should generate a continuous repositioning map between the virtual space and the physical space while aligning the coordinate system.

In contrast to the forced-mapping methods that fail to generate a unified coordinate system, space-registering methods may maintain the coordinate system by alignment-based approaches. The existing research proposed a space-aligning method for an AR telepresence system to maximize the movable empty area from two dissimilar spaces. Object-centric space-matching methods such as projecting a remote user onto their physical sofa or retargeting a round table and square table by grid-based mapping have also been proposed. Furthermore, some studies have proposed maximizing the semantic match ratio between different spaces to support users in walking, sitting, and placing objects. However, these methods may match heterogeneous spaces with a unified coordinate system, but easily output a narrow shared space when the number of spaces increases or the physical and virtual space configurations are largely different. But still, their approaches may support users' multi-states and register the area of interest, so an embodiment of the present disclosure may take advantage of subspace-centric alignment methods. On the other hand, subspace-alignment-based space registering methods mainly focus on maximizing the semantic match ratio between rooms. However, for an immersive VR experience, a spatial registration optimization algorithm should find optimal values that consider the context of the VR experience. Thus, for more context-aware space registration and to enable quantitative comparison, an embodiment of the present disclosure may propose several evaluation metrics for space registration centered on the main interaction object.

In an embodiment of the present disclosure, registering dissimilar virtual spaces to the target physical space is a challenging task that heavily depends on the spatial dissimilarity between two spaces. Therefore, it is helpful to understand the heterogeneity between the two spaces for a more constructive experiment design and analysis of registration results. However, spatial dissimilarity is challenging to represent numerically, as it has qualitatively described characteristics, such as the relationship between objects and spatial layout. Nevertheless, an embodiment of the present disclosure may still quantify some essential information from space, such as space size, object density, and object distribution, which are crucial for spatial matching. For example, in the architecture research field, there was a method for measuring the openness of space, but it only explained in spaces with the same number of building modules in different layouts. Additionally, robotics researchers attempted to quantitatively measure the environmental complexity to distinguish the difficulty of motion finding, but mostly considered empty navigable areas.

In AR and VR research, spatial complexity has been studied by ordering various spatial configurations to evaluate their effects on the user's narrative space-adaptive AR experience. However, they may not quantitatively measure the spatial complexity since they presented rating criteria for spatial complexity by comparing traversability and visual complexity terms. Recently, ARC proposed a method for calculating the environment's complexity from $C(p)$, which refers to the sum of the closest distance to the obstacle from every point p in the environment to the north, south, east, and west directions. They defined the complexity of environment $C(E)$ by summing $C(p)$ for every point in the space and dividing the added length by the number of points. While this method is universally applicable to the floorplan of the space, it may fail to present different complexities when both spaces have similar object densities, even though the size and spatial layout are different. To obtain more precise environmental complexity results, an embodiment of the present disclosure may propose to extend $C(E)$ by reflecting the space size, object density, and degree of object dispersion. Furthermore, using this extended measure of environmental complexity, an embodiment of the present disclosure may present equations for computing the environmental dissimilarity and difficulty level of registering virtual space to physical space centered on the target object.

Figure 2:
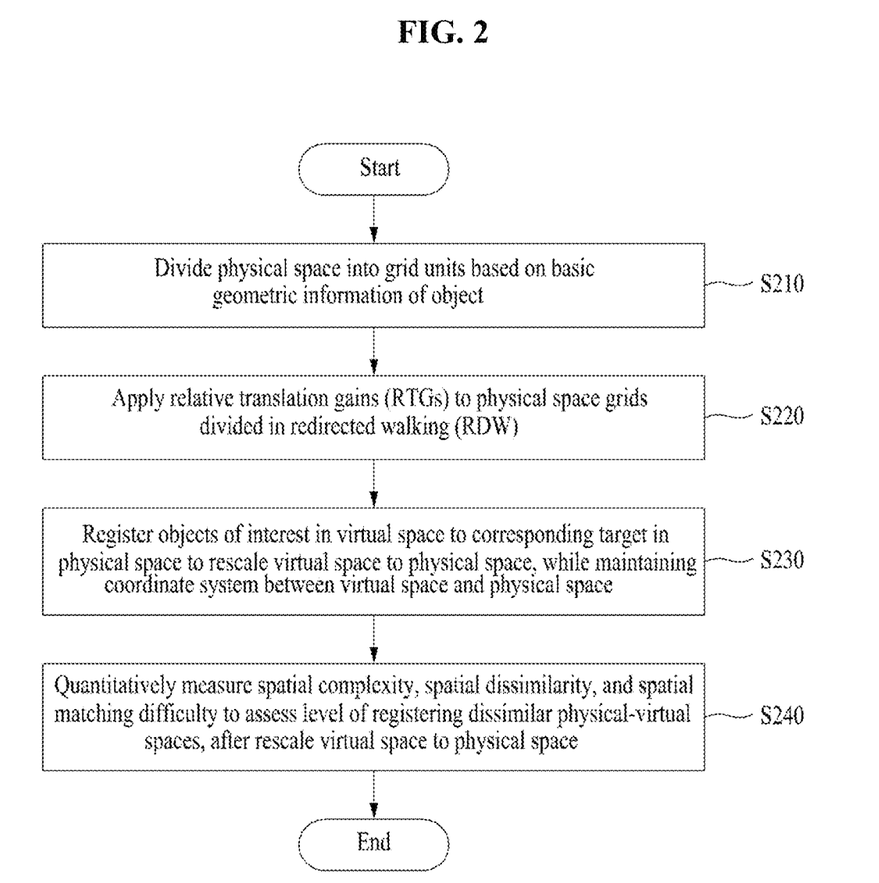
FIG. 2 illustrates an operational flowchart of an edge-centric space rescaling method according to an embodiment of the present disclosure.
Figure 3:
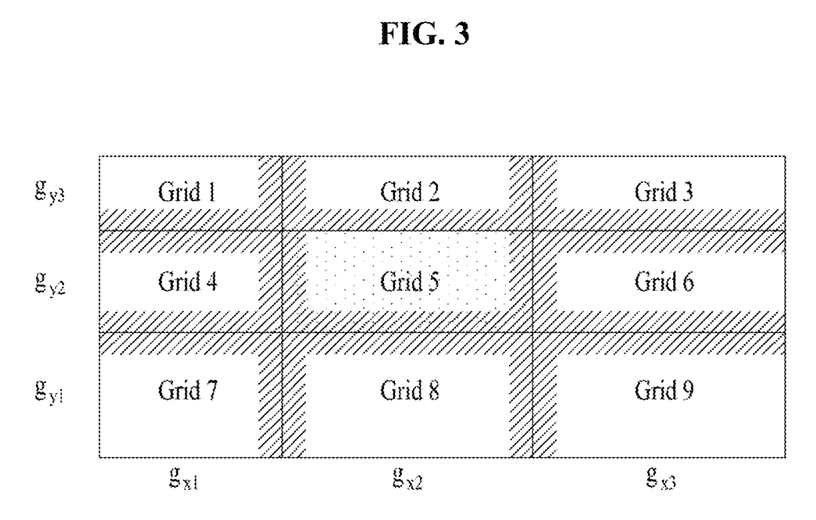
FIG. 3 illustrates a drawing for describing grid division according to an embodiment of the present disclosure.

FIG. 2 illustrates an operational flowchart of an edge-centric space rescaling method according to an embodiment of the present disclosure. FIG. 3 illustrates a drawing for describing grid division according to an embodiment of the present disclosure.

Figure 6:
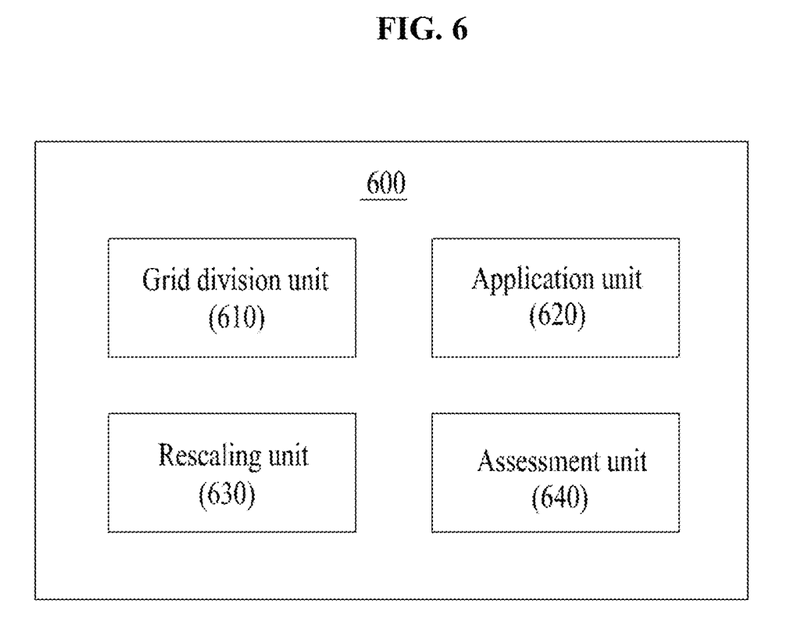
FIG. 6 illustrates a block diagram of a detailed configuration of an edge-centric space rescaling system according to an embodiment of the present disclosure.

The method of FIG. 2 may be performed by an edge-centric space rescaling system according to an embodiment of the present disclosure, which is illustrated in FIG. 6.

Referring to FIG. 2, in operation S210, physical space may be divided into grid units based on basic geometric information of an object. Operation S210 may be to divide space for space rescaling into a predetermined number based on basic geometric information of an interactable object's edge, a floor, a wall, a horizontal surface, and a vertical surface. At this time, operation S210 according to an embodiment of the present disclosure may be to divide the physical space, which is the target of rescaling, into a plurality of grids centered on the edge depending on the basis geometric information of the interactable object. In an embodiment of the present disclosure, it is shown and described that the physical space is divided into nine grids, but the number of grids is not limited thereto. Furthermore, the object may be, but is not limited to, a table, a wall surface, a movable floor, or the like shown in FIG. 1.

To be more specific, when an embodiment of the present disclosure interprets the redirected walking (RDW) applied to the user in terms of space, it may be explained as the effects of rescaling the user's physical space. To facilitate interaction with basic geometric features of the physical space in the virtual space and maintain a unified coordinate system between the two spaces, an embodiment of the present disclosure may utilize RTGs in RDW.

When applying RDW to VR users, it is crucial to consider the cognitive threshold range to avoid inducing simulator sickness. As the RTG threshold is influenced by spatial configuration, an embodiment of the present disclosure may employ the previously published findings to set an appropriate threshold range considering the target virtual space's spatial configuration. RTG consists of an x-axis translation gain ($g_x$) and a y-axis translation gain ($g_y$), and the RTG threshold is defined with a 2D translation ratio ($\alpha T$), which is the ratio of $g_x$ to $g_y$. At this time, by setting proper $\alpha T$, an embodiment of the present disclosure may adjust the scale of the physical space to better align with the users' visual cognitive threshold range, thus improving the adaptivity of the system in registering target virtual spaces.

The edge-centric space rescaling method according to an embodiment of the present disclosure may aim to find an optimal subspace from virtual space and physical space and register semantic information between the two spaces. Since it is challenging to match every object in dissimilar virtual-physical environments, an embodiment of the present disclosure needs to concentrate on matching the certain object, considering the target VR scenario. Therefore, an embodiment of the present disclosure may concentrate on registering the object of interest in the virtual space to the corresponding object in the physical space, which refers to as the main object. To achieve space-adaptive rescaling, an embodiment of the present disclosure may partition the space into grids centered on the main object's edge and may apply appropriate RTGs to each grid.

In operation S220, relative translation gains (RTGs) may be applied to the physical space grids divided in the redirected walking (RDW). Thus, operation S220 may be to linearly change gains between each grid.

Operation S220 may be to use translation-gain based redirected walking (RDW) as a space-rescaling element to generate a unified coordinate system between virtual space and physical space. Thus, operation S220 may apply the relative translation gains (RTGs) to each of the physical space grids to generate RTG pairs and may adaptively adjust space. At this time, operation S220 may be to set the RTG pairs within user's cognitive thresholds, such that a maximum difference between an x-axis translation gain and a y-axis translation gain in the divided space grids falls within an RTG threshold range.

In detail, as depicted in FIG. 3, operation S210 in an embodiment of the present disclosure may be to extend the edges of the main interaction object to create a total of nine grids and generate nine RTG pairs from the combination of three x-axis translation gains ($G_x=(g_{x1}, g_{x2}, g_{x3})$) and three y-axis translation gains ($G_y=(g_{y1}, g_{y2}, g_{y3})$) for each grid. Next, operation S220 in an embodiment of the present disclosure should set these nine RTGs within the user's cognitive threshold. By ensuring the maximum difference between $G_x$ and $G_y$ falls within the RTG threshold range, the other RTG pairs will also be within the corresponding threshold range. Therefore, the inequality equations for setting the RTG threshold may be written as Equations 1 and 2 below.

$$0.86 < g_x, g_y < 1.26 \qquad \text{[Equation 1]}$$

$$\alpha_l \leq \frac{\min(G_x)}{\max(G_y)}, \frac{\max(G_x)}{\min(G_y)} \leq \alpha_h \qquad \text{[Equation 2]}$$

Herein, each $g_x$ and $g_y$ should have a value between 0.86 to 1.26, and the lower boundary $\alpha_l$ and upper boundary an of the 2D translation ratio are defined to set the range of possible values for RTGs.

$\alpha_l$ and $\alpha_h$ may be set according to the target virtual space's configuration. After applying the optimal RTG values for space rescaling, sudden gain changes that may occur when a VR user moves from one grid to the next may induce motion sickness. To prevent this issue and make users less sensitive to the applied redirection gains, an embodiment of the present disclosure may apply linear gain smoothing for a distance of 0.5 m (0.25 m before and after passing the grid boundary). For example, when a user walks from Grid 1 to Grid 2 and is at a distance of d m from the boundary line between the two grids (−0.25 m<d<0.25 m), the x-axis translation $g_x$ will be $0.5(g_{x2}+g_{x1})+2(g_{x2}-g_{x1})d$. FIG. 3's dashed area indicates the smooth gain change area where RTG linearly changes from one grid to the beside grid. By doing so, sudden jumps in translation gain may be avoided. Through Equation 1 and Equation 2 described above, an embodiment of the present disclosure may set the proper RTGs for generating a redirection map that allows for space adaptive rescaling without sudden gain changes while still providing freedom of movement.

In operation S230, the objects of interest in the virtual space may be registered to a corresponding target in the physical space to rescale the virtual space to the physical space, while a coordinate system between the virtual space and the physical space is maintained. Operation S230 may be to use a spatial registration optimization algorithm to find optimal values for registering the virtual space to the physical space using the physical space spatially adjusted and rescaled by applying the relative translation gains (RTGs) to each of the physical space grids and to register the objects of interest in the virtual space to the corresponding target in the physical space by means of the spatial registration optimization algorithm. At this time, operation S230 may use the spatial registration optimization algorithm for space registration, for an edge sync ratio between the virtual space and the physical space.

to be more specific, to evaluate the performance of registering the target virtual environment to the tracked physical environment, an embodiment of the present disclosure may need quantitative evaluation metrics for finding optimal values and comparing results with other methods. Therefore, an embodiment of the present disclosure may propose four space-registering evaluation metrics to optimize the objective function of the spatial registration optimization algorithm, with a focus on precisely matching the edge and surface area of the main interaction object. The first metric is the edge sync ratio between the virtual main object and the physical main object. Previous studies have highlighted the importance of receiving passive feedback from physical objects while interacting with virtual objects for an immersive VR experience. Therefore, by aligning the edge of the virtual main object with the corresponding physical object, users may receive passive feedback while interacting with the main object in VR. Thus, to calculate the edge-alignment ratio of the main object between virtual space and physical space, an embodiment of the present disclosure may name it as object edge sync ratio $\Psi_{obj}$ and it may be defined as Equation 3 below.

$$\Psi_{obj}(G, \phi) = \frac{IL(O^*_{virt}, O^*_{phys})}{L(O^*_{virt}))} \quad \text{[Equation 3]}$$

Herein, G represents the nine RTG pairs used for rescaling the physical environment, while φ represents the relative position vector of the virtual environment to the physical environment. Furthermore, $O_{virt}^*$ and $O_{phys}^*$ are the top-viewed 2D polygon of the main object in the virtual environment and the physical environment, respectively. The variable $IL(O_{virt}^*, O_{phys}^*)$ denotes the sum of the intersected edge length between $O_{virt}^*$ and $O_{phys}^*$, while $L(O_{virt}^*)$ refers to the sum of the edge length of virt.

Using the object edge sync ratio $\Psi_{obj}$ may be to measure how much of the edge from the main object in the virtual space to the edge of the main object in the physical space.

The next evaluation metric is the wall sync ratio. An embodiment of the present disclosure may select the wall as an additional edge match target since it is one of the most common interaction planes, along with horizontal surfaces such as desks. By registering the wall, users may directly touch the physical wall when they attach virtual content to the virtual wall. An embodiment of the present disclosure may calculate the wall sync ratio $\Psi_{wall}$ using Equation 4 below.

$$\Psi_{wall}(G, \phi) = \frac{IL(F_{virt}, F_{phys})}{L(F_{virt})} \quad \text{[Equation 4]}$$

Herein, $F_{virt}$ and $F_{phys}$ represent the top-viewed polygon from the floor in a virtual and a physical environment, because the edges of the floor polygon refer to the wall. The sum of mutual intersection edge length between $F_{virt}$ and $F_{phys}$ is indicated by $IL(F_{virt}, F_{phys})$, while the sum of $F_{virt}$'s edge length is indicated by $L(F_{virt})$.

To assess the performance of the spatial registration optimization algorithm, the third metric focuses on the size of the registered space between the virtual environment and the physical environment. It is crucial to ensure a sufficiently large registered area for users to explore and interact more freely. Thus, an embodiment of the present disclosure may introduce the registered space size ratio $\Psi_{size}(G, \phi)$. This may be defined as Equation 5 below.

$$\Psi_{size}(G, \phi) = \frac{A(I(E_{virt}, E_{phys}))}{A(E_{virt})} \quad \text{[Equation 5]}$$

Herein, $I(E_{virt}, E_{phys})$ represents the intersected polygon resulting from aligning the multi-polygon input of $E_{virt}$ with that of $E_{phys}$. Through $A(I(E_{virt}, E_{phys}))$, an embodiment of the present disclosure may compute the registered area from the virtual environment and the physical environment. An embodiment of the present disclosure may then obtain the ratio of the registered space to the original virtual environment by dividing it by the virtual environment's area, $A(E_{virt})$.

The last metric is the semantic match ratio between two spaces. This is the most frequently used metric to measure the performance of spatial matching in previous alignment-based optimization algorithms, which means the ratio of the semantically aligned area out of the total registered space. The semantic match ratio $\Psi_{sem}(G, \emptyset)$ may be formalized as Equation 6 below.

$$\Psi_{sem}(G, \phi) = \frac{\sum_{l \in L} IA_l(E_{virt}, E_{phys})}{A(I(E_{virt}, E_{phys}))} \quad \text{[Equation 6]}$$

Herein, L is the set of possible semantic labels (floor, main object, and obstacle) and $IAl(E_{virt}, E_{phys})$ is the area of the intersected region of semantic label l after registering $E_{virt}$ to the $E_{phys}$. The numerator in Equation 6 above represents the total area of the intersected regions of all semantic labels, and the denominator represents the total area of the registered space. The resulting ratio $\Psi_{sem}(G, \phi)$ ranges from zero to one, where a higher value indicates a better semantic match between $E_{virt}$ and $E_{phys}$.

Finally, including all the above four metrics, an embodiment of the present disclosure may generate the objective function Equation 7 below that may be used for optimization.

$$O(G, \phi) = \omega_1 \Psi_{obj} + \omega_2 \Psi_{wall} + \omega_3 \Psi_{size} + \omega_4 \Psi_{sem} \quad \text{[Equation 7]}$$

All four evaluation metrics for spatial matching are unit-less ratios with a value between zero to one, with increases in each metric indicating better spatial matching performance in each aspect. By assigning weights to the coefficients ω in the objective function depending on the intended purpose of registering the virtual environment, an embodiment of the present disclosure may obtain optimal values for space rescaling and registering. For example, in a VR table tennis scenario, an embodiment of the present disclosure may assign the highest weight to ω1 to prioritize matching the edge of the table and may then give a relatively high weight to ω3 to maximize the registered area. The G and φ values that maximize the objective function will be the optimal values for registering the target virtual space to the user's physical space.

Furthermore, the edge-centric space rescaling method according to an embodiment of the present disclosure may further include operation S240. In operation S240, spatial complexity, spatial dissimilarity, and spatial matching difficulty may be quantitatively measured to assess the level of registering dissimilar physical-virtual spaces, after the virtual space is rescaled to the physical space.

Operation S240 may be to use spatial complexity for measuring the complexity of an environment with respect to space size, object density, and object distribution and to compute the spatial dissimilarity and the spatial matching difficulty for the virtual space and the physical space using the spatial complexity.

To be more specific, the performance of space registration is highly dependent on the dissimilarity between two spaces. So, an embodiment of the present disclosure may propose a way to measure spatial complexity, denoted as SC(E), which may capture relevant information about a virtual environment's size, object density, and object distribution. To express the complexity of a given space, an embodiment of the present disclosure may decompose it into two components, one related to the area and one associated with the spatial layout. Initially, an embodiment of the present disclosure may focus on the area component, composed of the space size and the area occupied by objects. Drawing on the concept of C(E), an embodiment of the present disclosure may aim to construct an SC(E) metric that increases when the complexity of a space decreases. While C(E) reflects the density of objects in a room, it was hard to capture information about the space size when it is not empty. To overcome these limitations, an embodiment of the present disclosure may incorporate the space size component into C(E) by multiplying the space area since C(E) already contains some information about space size. As SC(E) is overly sensitive to space size when an embodiment of the present disclosure directly multiplies the environment area, the embodiment of the present disclosure may multiply the square root of the environment area by C(E) to reduce this effect.

In order to reflect the spatial layout of a virtual environment, an embodiment of the present disclosure may propose a new term, object scatteredness (OS(E)), which considers the distribution of objects in the space. As the spatial complexity of the environment decreases when objects are more scattered, OS(E) should increase accordingly to contain the spatial complexity in SC(E). As the area occupied by objects is already reflected in C(E), an embodiment of the present disclosure may define OS(E) as Equation 8 below.

$$OS(E) = \left( \frac{\sum_{O_i, O_j \in O} d(O_i, O_j)}{2N(O)} \right)^2 \quad \text{[Equation 8]}$$

Herein, O is every object in the E, and $o_i$ and $o_j$ denote the center positions of the bounding boxes of $O_i$ and $O_j$, respectively. $d(o_i, o_j)$ represents the distance between $o_i$ and $o_j$. The number of objects (the main object and obstacles) is denoted by N(O). Since $d(o_n, o_m)$ and $d(o_m, o_n)$ are added twice in the numerator equation even though they refer to the same distance between $O_n$ and $O_m$, an embodiment of the present disclosure may divide $\Sigma_{o_i, o_j} \in O^{d(o_i, o_j)}$ with 2N(O) for the average distance between two object pairs. The resulting unit of OS(E) is m$^2$, which is consistent with the unit of $\sqrt{A(E)} \times C(E)$ As demonstrated, Equation 8 above does not incorporate object area information but includes the distance between them.

In conclusion, the spatial complexity SC(E) can be computed with Equation 9 below.

$$SC(E) = \sqrt{A(E)} \times C(E) + OS(E) \quad \text{[Equation 9]}$$

Herein, A(E) represents the E's total floor area. C(E) is the complexity term defined in ARC, while OS(E) represents the object scatteredness. Through Equation 9 above, an embodiment of the present disclosure may obtain spatial complexity, which contains environmental information such as space size, object density, and the distribution of objects.

To measure the spatial dissimilarity between the physical environment and the virtual environment, an embodiment of the present disclosure may compare spatial complexity values, denoted by $SC(E_{virt})$ and $SC(E_{phys})$, respectively. However, dividing $SC(E_{virt})$ by $SC(E_{phys})$ alone may result in a lower value when $SC(E_{phys})$ is larger than $SC(E_{virt})$, even though the dissimilarity between the two spaces is high. To address this issue, an embodiment of the present disclosure may propose Equation 10 below to calculate the spatial dissimilarity $SD(E_{virt}, E_{phys})$.

$$SD(E_{virt}, E_{phys}) = \left| \ln \left( \frac{SC(E_{virt})}{SC(E_{phys})} \right) \right| \quad \text{[Equation 10]}$$

By applying the logistic function and the absolute function to the ratio of $SC(E_{virt})$ and $SC(E_{phys})$, the resulting value is independent of the order of the numerator and denominator. An increase in SD signifies a higher dissimilarity between the physical environment and the virtual environment.

In order to measure the difficulty level of aligning the virtual space and the physical space that are centered on the main interaction object, an embodiment of the present disclosure may introduce a spatial matching difficulty indicator called $SMD(E_{virt}, E_{phys})$, which is based on the spatial dissimilarity $SD(E_{virt}, E_{phys})$ from Equation 10 above. Instead of considering every basic geometric information of the spaces, the approach according to an embodiment of the present disclosure may focus on aligning subspaces from both spaces that are centered on a main object with a planar surface, such as a desk or a table. The difficulty of spatial alignment depends on this main object, which is reflected through the planar area of the central object of interaction. Thus, an embodiment of the present disclosure may define the $SMD(E_{virt}, E_{phys})$ as Equation 11 below.

$$SMD(E_{virt}, E_{phys}) = \left| \ln \left( SD(E_{virt}, E_{phys}) \times \frac{A(O^*_{virt})}{A(O^*_{phys})} \right) \right| \quad \text{[Equation 11]}$$

An embodiment of the present disclosure may multiply the main object's surface area ratio between the virtual space and the physical space to the $SD(E_{virt}, E_{phys})$. Similar to the $SD(E_{virt}, E_{phys})$, an embodiment of the present disclosure may also apply the logistic function and the absolute function to focus on the difference between the main object's surface area in two spaces. Using the SMD obtained from Equation 11 above, an embodiment of the present disclosure may quantify the difficulty level in aligning the virtual space and the physical space centered on the main object. Similar to SD, an increase in SMD indicates a higher difficulty in registering $E_{virt}$ to $E_{phys}$.

Figure 4:
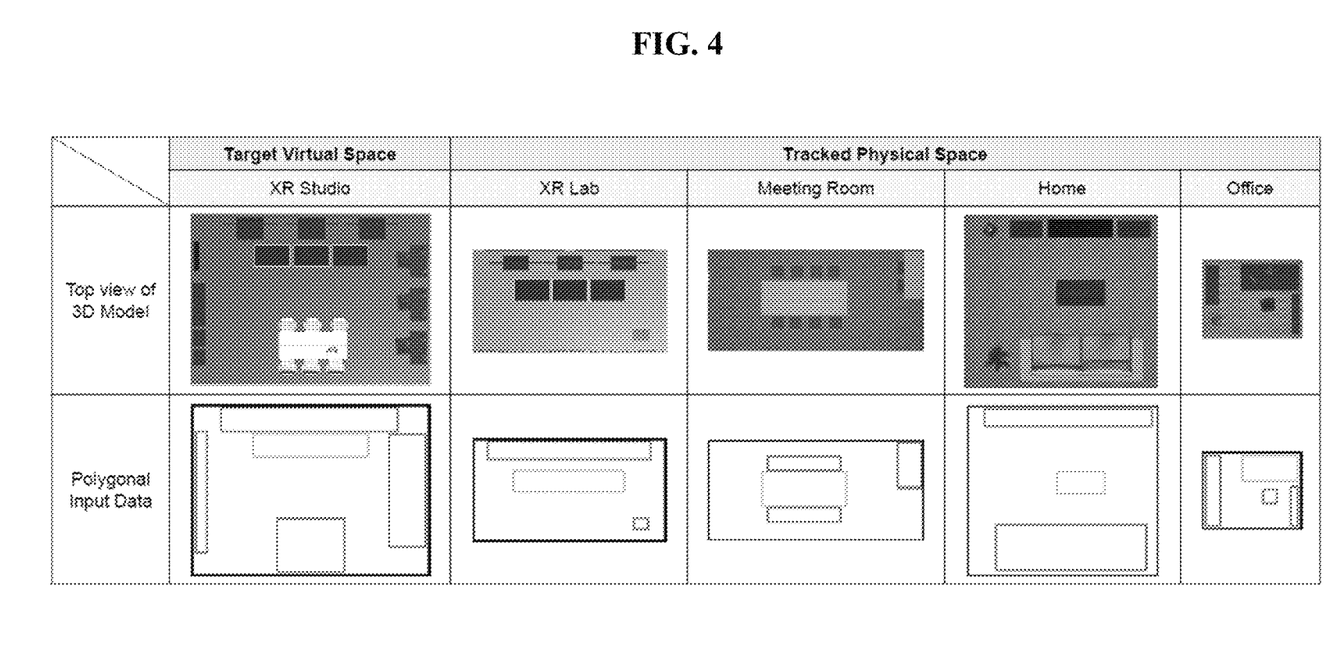
FIG. 4 illustrates five input spaces for evaluation according to an embodiment of the present disclosure.
Figure 5A:
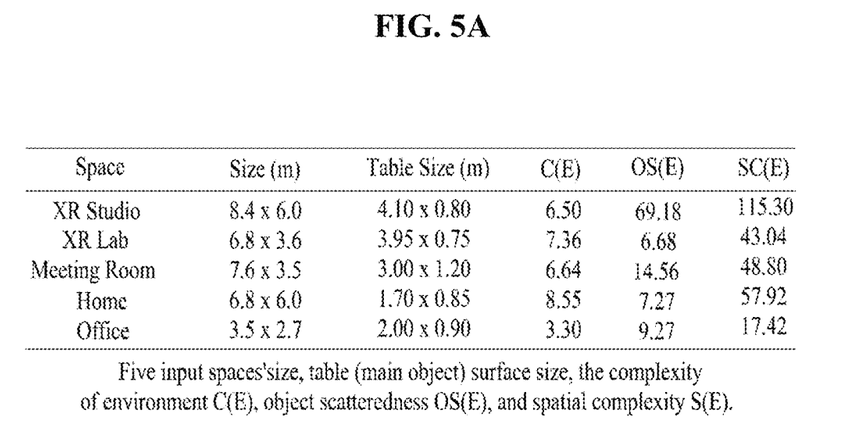
FIG. 5A illustrates a table of input space information according to an embodiment of the present disclosure.
Figure 5B:
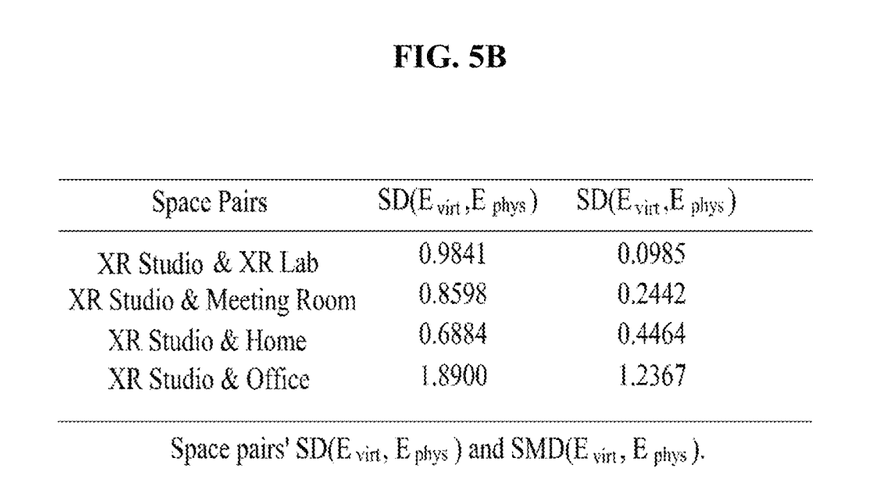
FIG. 5B illustrates a table of spatial dissimilarity and spatial matching difficulty according to an embodiment of the present disclosure.

FIG. 4 illustrates five input spaces for evaluation according to an embodiment of the present disclosure. Furthermore, FIG. 5A illustrates a table of input space information according to an embodiment of the present disclosure, and FIG. 5B illustrates a table of spatial dissimilarity and spatial matching difficulty according to an embodiment of the present disclosure.

In detail, FIG. 4 illustrates generating polygonal input data from the top view of 3D indoor space models. The polygon's color refers to the following semantic labeled polygon: Black—floor, orange—the main object (table), red—obstacles.

Evaluation according to an embodiment of the present disclosure may aim to compare the performance of a proposed spatial registration optimization algorithm with two existing methods by validating four proposed metrics for registering spaces around the main object. Additionally, an embodiment of the present disclosure will distinguish whether SMD is properly correlated with the difficulty of matching the physical space and the virtual space. The evaluation procedure may involve generating input spaces for AR/VR remote collaboration scenarios, where VR clients from different remote locations may collaborate with AR hosts in an XR Studio (the target virtual space). The XR Studio is equipped with three large monitors, tables, PC desks, and a meeting table with chairs to facilitate a sense of coexistence in remote collaboration. The 3D model of the XR Studio, shown in FIG. 4, is similar in telepresence components (three large monitors and wide table) in the Cisco TelePresence IX5000 Series. This system enables a seamless transition between an immersive video conference scenario where remote space is extended through large displays and an avatar-mediated telepresence scenario where the remote user is able to connect to the hosting space through VR HMD. An XR meeting scenario according to an embodiment of the present disclosure may designate the table in front of the three monitors as the main object, and the embodiment of the present disclosure may preprocess the 3D model into multi-polygon type input with the labeled floor, main object, and obstacle areas. As depicted in FIG. 4, each label is drawn with different boundary colors where the floor area is black, the main object is orange, and the obstacles are red.

Thus, to match the target virtual space of XR Studio, an embodiment of the present disclosure may utilize four types of rooms to vary the SMD level between each client's space and XR studio. The physical spaces are labeled with the floor, main object, and obstacles and are shown in FIG. 4, using the same color scheme as the target virtual space. The XR Lab is created based on the space used for XR experiments, with a similar layout to XR Studio but with differences in the number of obstacles and movable space size. The Meeting Room has a wide table in the middle and chairs around it, and another small desk and chairs are placed in the corner. The Home has two obstacles placed in top and bottom positions, and the area of the main object is approximately half of that in XR Studio. Lastly, the Office has a different spatial configuration from XR Studio in every aspect, including space size, desk size, and obstacle arrangement. Each physical space layout is designed to evaluate the performance of the proposed algorithm and is depicted in FIG. 4.

An embodiment of the present disclosure may create four space pairs by combining the target virtual space (XR Studio) with the four physical spaces, resulting in different dissimilarity levels. Table 1 shown in FIG. 5A displays the size of each space and the main object's surface for the five input spaces. An embodiment of the present disclosure may calculate C(E) using a point sampling with every 0.2 m and may obtain OS(E) with Equation 8 above, which are also listed in Table 1. The SD and SMD for each space pair are shown in Table 2 shown in FIG. 5B. The first space pair, XR Studio & XR Lab, have similar tables and monitors but have different space sizes and obstacles, resulting in an SD of 0.9841 and SMD of 0.0985. The second pair, XR Studio & Meeting Room, share similar table sizes but differ in the width-depth ratio of the space and spatial layout, resulting in an SD of 0.8598 and SMD of 0.2442. The third pair, XR Studio & Home, have similar space sizes, but the main object in Home is about half the size of that in XR Studio, resulting in an SD of 0.6884 and SMD of 0.4464. The final pair, XR Studio & Office, are dissimilar in almost every aspect, resulting in the highest SD and SMD compared to other space pairs, with an SD of 1.8900 and SMD of 1.2367, respectively.

In order to evaluate the effectiveness of a space registration method proposed in an embodiment of the present disclosure, the embodiment of the present disclosure will compare its results with those of two other methods: the 1:1 Scale method, which matches spaces at a one-to-one scale without modifying it, and the Single-RTG method, which applies a single RTG to the entire physical space. The edge-centric space rescaling method according to an embodiment of the present disclosure, RTG-Grid, may divide the space into nine grids centered on the main object and may use RTG for each grid. To evaluate these methods, an embodiment of the present disclosure may run a spatial registration optimization algorithm for spatial matching on four space pairs, with the main object being the table. An embodiment of the present disclosure may prioritize the table edge sync ratio and the wall edges being the next most important factor, which is useful for placing and attaching virtual objects in the XR meeting scenario. Furthermore, an embodiment of the present disclosure may also measure the ratio of the registered table area to compare the utilizable table surface between the methods. Finally, an embodiment of the present disclosure may assign weights based on the space match ratio and the size of the registered space from the intersection of the physical space and the virtual space. The spatial registration optimization algorithm according to an embodiment of the present disclosure may then find optimal RTGs and positions that maximize alignment between the table's edge and the wall while securing a sufficient registered area with a high semantic match ratio. An embodiment of the present disclosure will use these edge-centric evaluation metrics to validate the effectiveness of the method.

A system may be implemented using the edge-centric space rescaling method according to an embodiment of the present disclosure, based on the above-mentioned configurations.

In the spatial registration optimization algorithm for spatial matching, an embodiment of the present disclosure assumes that the initial input is a 3D model with semantic labels and a 3D bounding box. An embodiment of the present disclosure may extract a floorplan from the top view of each 3D space model and may create a polygon based on the bounding box with three semantic labels. The first label, "floor," indicates where users are able to walk in the space. The second label, "main object," identifies the object that will be used as the center of virtual content. Since matching the entire physical space to the virtual space is difficult, an embodiment of the present disclosure may be focused on a user-interactive object of interest and may label it as the main object. The third label, "obstacle," is assigned to the remaining objects in the physical space and the virtual space, as users are unable to move around areas where objects exist. The input data for the spatial registration optimization algorithm is shown in FIG. 4's polygonal input data row. The input data is expressed as multi-polygons with information on one of the three semantic labels. Each polygon is made up of points, and an embodiment of the present disclosure represents the polygonal input data as a list of points.

The preprocessed multi-polygon inputs are rescaled with corresponding RTGs to enhance the effect of rescaling. The RTG is applied differently for each grid divided based on the main object to obtain rescaled polygons of input physical space. The four space-registering evaluation metrics are computed by intersecting this rescaled physical polygon with the target virtual space (the XR Studio). To identify whether polygons are intersected and the area of an intersected polygon, the polygon-clipping method is used. Intersection areas between two input polygons are measured, and the semantic match ratio and the registered space size are also calculated. Algorithms are developed to measure the semantic match ratio for multiple polygons and the edge concordance rate between two polygons. The weight of the objective function Equation 7 above is set as $\omega 1=100$, $\omega 2=30$, $\omega 3=5$, and $\omega 4=10$ to match the edge and planar information of the main object primarily. For the RTG threshold range, XR Studio has a similar configuration with Medium×Furnished condition from the existing experiment condition, so an embodiment of the present disclosure sets the threshold value $\alpha l$ as 0.92 and $\alpha h$ as 1.23.

An embodiment of the present disclosure conducts evaluations on a MacBook Pro 13-inch Monterey OS with Apple M1, 8-core CPU, 16 GB RAM, and 512 GB SSD. To implement the system according to an embodiment of the present disclosure, the embodiment of the present disclosure installs the python optimization library Pygmo 2.19.0 in the Anaconda virtual environment of python 3.9.13 and utilizes a python library Pypex4 for work with polygons in 2D. As RTG-Grid has four inequality constraints for six input variables (six translation gains) and RTG-Single has two inequality constraints for two input variables (two translation gains), an embodiment of the present disclosure uses Pygmo's metaoptimization algorithm based on Farmani's self-adaptive fitness formulation. For the comparison spatial-matching method with a 1:1 scale, an embodiment of the present disclosure employs the extended ant colony optimization algorithm since the input variable for the 1:1 scale's input variables (position vector) has no inequality constraints between them. To visualize the spatial matching results, an embodiment of the present disclosure uses python's Pillow (PIL) 9.4.0 library. The edge sync function determined as the edge may be matched accurately using the hand redirection techniques when the same labeled polygons' edges from the physical space and the virtual space are parallel and less than 0.01 m and the optimization is performed by receiving the float type inputs.

FIG. 6 illustrates a block diagram of a detailed configuration of an edge-centric space rescaling system according to an embodiment of the present disclosure.

An edge-centric space rescaling system 600 according to an embodiment of the present disclosure may apply relative translation gains (RTGs) to each of space grids divided based on the main interactable object's edge, which enables space modification effects to register vast interactable space while maintaining the coordinate system between physical space and virtual space.

To this end, the edge-centric space rescaling system 600 according to an embodiment of the present disclosure may include a grid division unit 610, an application unit 620, a rescaling unit 630, and an assessment unit 640.

The grid division unit 610 may divide physical space into grid units based on basic geometric information of an object. The grid division unit 610 may divide space for space rescaling into a predetermined number based on basic geometric information of an interactable object's edge, a floor, a wall, a horizontal surface, and a vertical surface. At this time, the grid division unit 610 according to an embodiment of the present disclosure may divide the physical space, which is the target of rescaling, into a plurality of grids centered on the edge depending on the basic geometric information of the interactable object. In an embodiment of the present disclosure, it is shown and described that the physical space is divided into nine grids, but the number of grids is not limited thereto. Furthermore, the object may be, but is not limited to, a table, a wall surface, a movable floor, or the like shown in FIG. 1.

The application unit 620 may apply the relative translation gains (RTGs) to the physical space grids divided in the redirected walking (RDW). Thus, the application unit 620 may linearly change gains between each grid.

The application unit 620 may use translation-gain based redirected walking (RDW) as a space-rescaling element to generate a unified coordinate system between virtual space and physical space. Thus, the application unit 620 may apply the relative translation gains (RTGs) to each of the physical space grids to generate RTG pairs and may adaptively adjust space. At this time, the application unit 620 may set the RTG pairs within user's cognitive thresholds, such that a maximum difference between an x-axis translation gain and a y-axis translation gain in the divided space grids falls within an RTG threshold range.

The rescaling unit 630 may register objects of interest in the virtual space to a corresponding target in the physical space to rescale the virtual space to the physical space, while maintaining a coordinate system between the virtual space and the physical space. The rescaling unit 630 may use a spatial registration optimization algorithm to find optimal values for registering the virtual space to the physical space using the physical space spatially adjusted and rescaled by applying the relative translation gains (RTGs) to each of the physical space grids and may register the objects of interest in the virtual space to the corresponding target in the physical space by means of the spatial registration optimization algorithm. At this time, the rescaling unit 630 may use the spatial registration optimization algorithm for space registration, for an edge sync ratio between the virtual space and the physical space.

Furthermore, the edge-centric space rescaling system 600 according to an embodiment of the present disclosure may further include the assessment unit 640. The assessment unit 640 may quantitatively measure spatial complexity, spatial dissimilarity, and spatial matching difficulty to assess the level of registering dissimilar physical-virtual spaces, after rescaling the virtual space to the physical space.

The assessment unit 640 may use the spatial complexity for measuring the complexity of an environment with regard to space size, object density, and object distribution and may compute the spatial dissimilarity and the spatial matching difficulty for the virtual space and the physical space using the spatial complexity.

It is apparent to those skilled in the art that, although the description is omitted in the system of FIG. 6, the respective means making up FIG. 6 may include all contents described in FIGS. 1 to 5B. This is obvious to those skilled in the art.

The foregoing systems or devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPGA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of under-standing, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively instruct the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be stored in one or more computer-readable storage media.

The methods according to the above-described exemplary embodiments of the inventive concept may be recorded in computer-readable media including program instructions to implement various operations embodied by a computer. The computer-readable media may also include, alone or in combination with the program instructions, data files, data structures, and the like. The program instructions recorded in the media may be designed and configured specially for the exemplary embodiments of the inventive concept or be known and available to those skilled in computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to an embodiment of the present disclosure, the edge-centric space rescaling system may be effective in aligning the main object's edge, the floor, the wall, the horizontal surface, and the vertical surface and securing the largest registered area compared to other methods in every condition by utilizing the edge-centric space rescaling technique.

According to an embodiment of the present disclosure, the edge-centric space rescaling system may create an immersive virtual environment where users are able to receive passive feedback from the plane and edge in their physical environment and may extend to mixed reality (MR) remote collaboration scenarios where remote users collaborate with co-presence in a mutual space.

Herein, the effect of the present disclosure is not limited to the effects and may be expanded in various manners from a range which does not deviate from the technical spirit and scope and the present disclosure.

While a few embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned components, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An edge-centric space rescaling method by an edge-centric space rescaling system for dissimilar physical-virtual space registration, the edge-centric space rescaling method comprising:
   dividing physical space into grid units based on basic geometric information of an object;
   applying relative translation gains (RTGs) to physical space grids divided in redirected walking (RDW); and
   registering objects of interest in virtual space to a corresponding target in physical space to rescale the virtual space to the physical space, while maintaining a coordinate system between the virtual space and the physical space.

2. The edge-centric space rescaling method of claim 1, wherein the dividing includes:
   dividing space for space rescaling into a predetermined number based on the basic geometric information of an interactable object's edge, a floor, a wall, a horizontal surface, and a vertical surface.

3. The edge-centric space rescaling method of claim 2, wherein the dividing includes:
   dividing the physical space, which is the target of rescaling, into a plurality of grids centered on the edge depending on the basic geometric information of the interactable object.

4. The edge-centric space rescaling method of claim 1, wherein the applying includes:
   using translation-gain based redirected walking (RDW) as a space-rescaling element to generate a unified coordinate system between the virtual space and the physical space.

5. The edge-centric space rescaling method of claim 4, wherein the applying includes:
   applying the relative translation gains (RTGs) to the physical space grids to generate RTG pairs and adaptively adjusting space.

6. The edge-centric space rescaling method of claim 5, wherein the applying includes:
   setting the RTG pairs within a user's cognitive threshold, such that a maximum difference between an x-axis translation gain and a y-axis translation gain in the divided space grids falls within an RTG threshold range.

7. The edge-centric space rescaling method of claim 4, wherein the rescaling includes:
   using a spatial registration optimization algorithm to find optimal values for registering the virtual space to the physical space using the physical space spatially adjusted and rescaled by applying the relative translation gains (RTGs) to the physical space grids; and
   registering the objects of interest in the virtual space to the corresponding target in the physical space by means of the spatial registration optimization algorithm.

8. The edge-centric space rescaling method of claim 1, further comprising:

quantitatively measuring spatial complexity, spatial dissimilarity, and spatial matching difficulty to assess the level of registering dissimilar physical-virtual spaces, after rescaling the virtual space to the physical space.

9. The edge-centric space rescaling method of claim 8, wherein the assessing includes:
using the spatial complexity for measuring the complexity of an environment with regard to space size, object density, and object distribution and computing the spatial dissimilarity and the spatial matching difficulty for the virtual space and the physical space using the spatial complexity.

10. An edge-centric space rescaling method by an edge-centric space rescaling system for dissimilar physical-virtual space registration, the edge-centric space rescaling method comprising:
dividing physical space into grid units based on basic geometric information of an object;
applying relative translation gains (RTGs) to physical space grids divided in redirected walking (RDW);
registering objects of interest in virtual space to a corresponding target in physical space to rescale the virtual space to the physical space, while maintaining a coordinate system between the virtual space and the physical space; and
quantitatively measuring spatial complexity, spatial dissimilarity, and spatial matching difficulty to assess the level of registering dissimilar physical-virtual spaces, after rescaling the virtual space to the physical space,
wherein the applying includes:
using a spatial registration optimization algorithm for space registration, for an edge sync ratio between the virtual space and the physical space.

11. An edge-centric space rescaling system for dissimilar physical-virtual space registration, the edge-centric space rescaling system comprising:
a grid division unit configured to divide physical space into grid units based on basic geometric information of an object;
an application unit configured to apply relative translation gains (RTGs) to physical space grids divided in redirected walking (RDW); and
a rescaling unit configured to register objects of interest in virtual space to a corresponding target in physical space to rescale the virtual space to the physical space, while maintaining a coordinate system between the virtual space and the physical space.

12. The edge-centric space rescaling system of claim 11, wherein the grid division unit divides space for space rescaling into a predetermined number based on the basic geometric information of an interactable object's edge, a floor, a wall, a horizontal surface, and a vertical surface.

13. The edge-centric space rescaling system of claim 12, wherein the grid division unit divides the physical space, which is the target of rescaling, into a plurality of grids centered on the edge depending on the basic geometric information of the interactable object.

14. The edge-centric space rescaling system of claim 11, wherein the application unit uses translation-gain based redirected walking (RDW) as a space-rescaling element to generate a unified coordinate system between the virtual space and the physical space.

15. The edge-centric space rescaling system of claim 14, wherein the application unit applies the relative translation gains (RTGs) to the physical space grids to generate RTG pairs and adaptively adjusts space.

16. The edge-centric space rescaling system of claim 15, wherein the application unit sets the RTG pairs within a user's cognitive threshold, such that a maximum difference between an x-axis translation gain and a y-axis translation gain in the divided space grids falls within an RTG threshold range.

17. The edge-centric space rescaling system of claim 15, wherein the rescaling unit uses a spatial registration optimization algorithm to find optimal values for registering the virtual space to the physical space using the physical space spatially adjusted and rescaled by applying the relative translation gains (RTGs) to the physical space grids and registers the objects of interest in the virtual space to the corresponding target in the physical space by means of the spatial registration optimization algorithm and registers semantic information between the virtual space and the physical space.

18. The edge-centric space rescaling system of claim 11, further comprising:
an assessment unit configured to quantitatively measure spatial complexity, spatial dissimilarity, and spatial matching difficulty to assess the level of registering dissimilar physical-virtual spaces, after rescaling the virtual space to the physical space.

19. The edge-centric space rescaling system of claim 18, wherein the assessment unit uses the spatial complexity for measuring the complexity of an environment with regard to space size, object density, and object distribution and computes the spatial dissimilarity and the spatial matching difficulty for the virtual space and the physical space using the spatial complexity.

* * * * *